United States Patent [19]

Bennett

[11] Patent Number: 4,945,712

[45] Date of Patent: Aug. 7, 1990

[54] APPARATUS FOR HEAT SEALING THERMOPLASTIC SHEETING

[76] Inventor: Charles J. Bennett, P.O. Box 154, Rte. 2, Oakboro, N.C. 28129

[21] Appl. No.: 225,031

[22] Filed: Jul. 27, 1988

[51] Int. Cl.⁵ .................. B65B 9/02; B65B 9/06; B65B 51/26; B65B 51/28

[52] U.S. Cl. .................... 53/555; 53/568; 53/373

[58] Field of Search ........... 53/568, 562, 555, 550, 53/553, 373; 156/361, 498, 515, 583.2

[56] References Cited

U.S. PATENT DOCUMENTS

| | | |
|---|---|---|
| Re. 30,010 | 5/1979 | Shanklin . |
| 2,613,488 | 10/1952 | Attride .................. 53/575 X |
| 3,239,993 | 3/1966 | Cherrin .................. 53/568 |
| 3,347,729 | 10/1967 | Seefluth . |
| 3,429,100 | 2/1969 | Zelnick et al. ............... 53/568 |
| 3,490,981 | 1/1970 | Shanklin . |
| 3,653,177 | 4/1972 | Adams et al. ............... 53/550 |
| 4,035,983 | 7/1977 | Shanklin . |
| 4,219,988 | 9/1980 | Shanklin . |
| 4,532,753 | 8/1985 | Kovacs ..................... 53/373 X |
| 4,650,535 | 3/1987 | Bennett et al. . |
| 4,719,741 | 1/1988 | Mabry ...................... 53/373 X |

*Primary Examiner*—Horace M. Culver
*Attorney, Agent, or Firm*—Shefte, Pinckney & Sawyer

[57] ABSTRACT

An improvement in film sealing apparatus, such as L-sealers, having an endless package discharge conveyor provides an arrangement for momentary conveyor reversal at the beginning of each sealing cycle to relieve film tension for maximization of seal strength. A cooling manifold directs an air stream at the transverse seal line at the completion of each sealing cycle to accelerate the curing of the seal to prevent undesired seal separation.

10 Claims, 3 Drawing Sheets

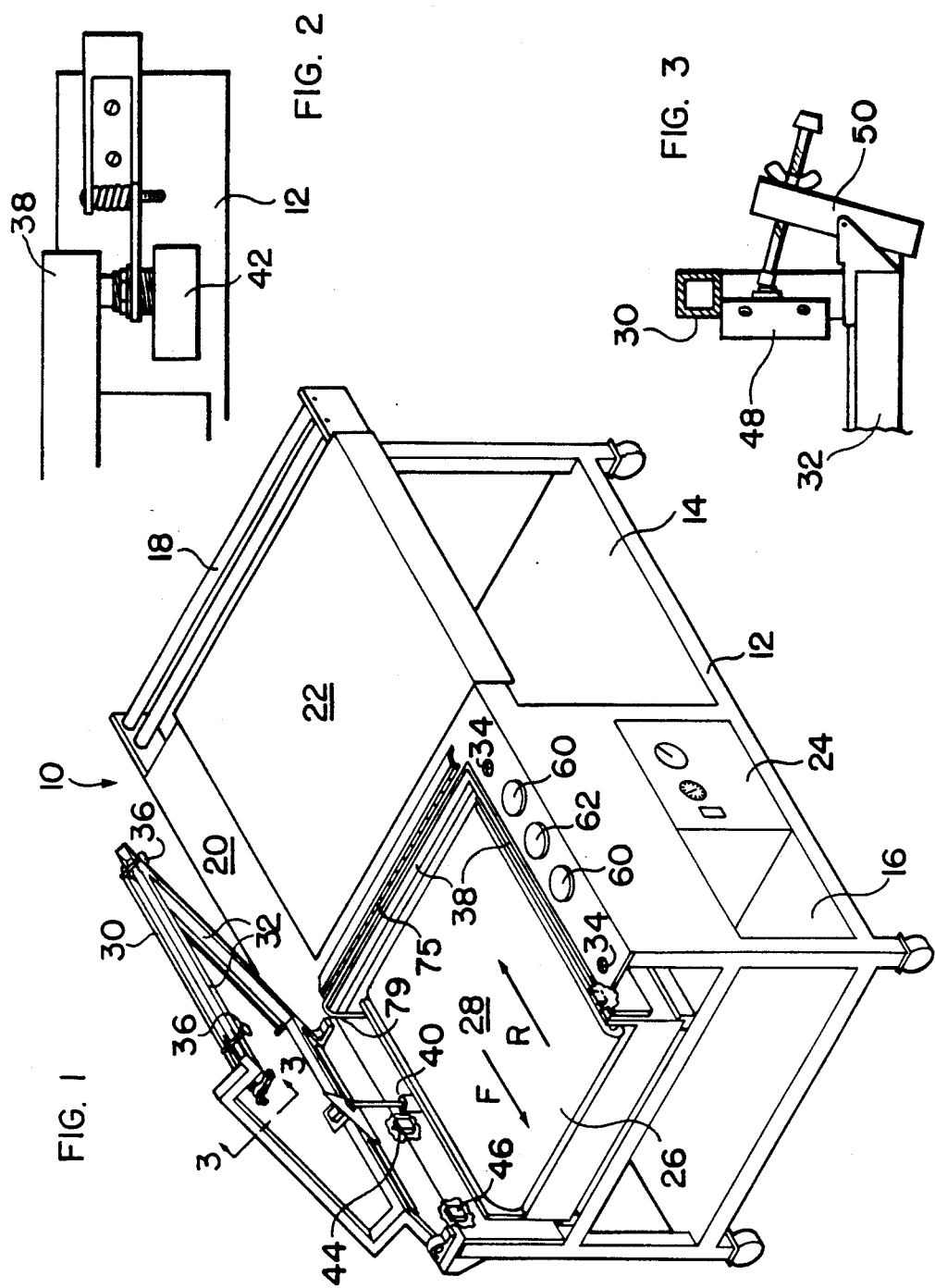

APPARATUS FOR HEAT SEALING THERMOPLASTIC SHEETING

BACKGROUND OF THE INVENTION

The present invention relates to apparatus for heat sealing thermoplastic sheeting, e.g., so-called L-sealers, and, more particularly, to a novel arrangement for relieving tension in the sheeting during the sealing operation to achieve enhanced sealing strength.

In recent years, it has been increasingly popular and commonplace to package many commercial articles in close-fitting transparent plastic film. This packaging is accomplished conventionally by wrapping the article to be packaged loosely in a heat shrinkable plastic film, sealing together the abutting edges of the film to enclose the article, and subjecting the package to sufficient heat to activate shrinkage of the film tightly about the article.

Machines commonly referred to as L-sealers are available for commercially accomplishing the preliminary wrapping procedure as above-described. Heat shrinkable plastic film in continuous sheets pre-folded along a central longitudinal edge and packaged in convenient rolled form is utilized for this purpose. L-sealing machines characteristically provide a sealing table surface, usually an endless conveyor, for supporting the plastic film with the article inserted between the folds of the film and a pair of L-shaped jaws at the table adapted for receiving and grippingly engaging the film therebetween. One of the jaws is provided with a heated wire sealing arrangement to simultaneously sever and seal the film along a continuous L-shaped seal line extending parallel to the folded edge of the film and transversely between the parallel sealed extent and the folded edge. In continuous operation, the transverse seal formed in making each package provides the initial transverse seal for the next package so that each described L-sealing operation provides complete package formation. Representative examples of L-sealing equipment of the described type are found in U.S. Pat. Nos. 3,347,729; 3,490,981; Re. 30,010; 4,035,983; and 4,650,535. A more sophisticated L-sealing apparatus adapted for automatic high speed operation is disclosed in U.S. Pat. No. 4,219,988.

As will be appreciated, it is extremely important in the described L-sealing operation that a strong seal be formed uniformly and continuously along the L-seal line in order to insure proper shrinkage of the film about the package. The satisfactory accomplishment of this purpose has been an ongoing problem in the L-sealing industry for many years. Virtually all L-sealers utilized as one jaw a sealing bed fixed to the machine frame at the sealing table surface and as the other jaw a movable sealing arm pivoted to the frame and carrying the heated L-seal wires. Formation of the L-seal is a function of two basic criteria: (1) the proper alignment of the sealing bed and of the sealing arm with one another, and (2) the exertion of uniform sealing pressure along the entire L-seal line when the sealing bed and arm are closed together for sealing operation.

The aforementioned U.S. Pat. No. 4,650,535 discloses an improved L-sealing apparatus wherein an L-shaped sealing bed assembly is mounted at its ends and corner on three piston-and-cylinder assemblies operable upon closing of the sealing arm into adjacency with the sealing bed assembly to translatorily move the sealing bed assembly into uniform and continuous surface contact and pressure with the heating wire arrangement of the sealing arm. In this manner, this improved L-sealing apparatus automatically achieves self-alignment and uniform sealing pressure along the sealing bed and sealing arm to optimally satisfy the noted criteria.

While the apparatus of U.S. Pat. No. 4,650,535 achieves seals which are characteristically of superior strength to other conventional L-sealing apparatus, other factors may still affect and limit strength of the seal produced. In the normal sequence of operation of L-sealing apparatus, a machine operator inserts the article to be packaged between the facing webs of the folded plastic film and the film and package are moved into sealing disposition on the conveyor or other sealing table. Normally, this operation tautly tensions the opposed facing webs of the folded thermoplastic film to an extent that, if left tensioned, the film webs will resist movement into sealing contact with one another when the sealing arm is moved into sealing relationship with the sealing bed and thereby may inhibit or even prevent proper sealing of the film webs together. No conventional L-sealing machinery is known which addresses this particular problem. Instead, operators of conventional L-sealing apparatus are trained to pull a sufficient additional amount of film from its storage roll each time an article and film are moved into sealing position on the conveyor or other sealing table of the apparatus so that the extent of the film to be captured between the sealing bed and sealing arm is essentially untensioned. This technique is, of course, inherently unreliable and highly subject to variations in operator performance.

SUMMARY OF THE INVENTION

It is accordingly an object of the present invention to provide an improved apparatus for heat sealing thermoplastic sheeting, such as an L-sealer, which is adapted to repeatedly and reliably relieve tension in the thermoplastic sheeting preparatory to the sealing operation to maximize the strength of the seal produced.

Briefly summarized, the present invention is broadly adapted for use in any apparatus for heat sealing thermoplastic sheeting of the type comprising a work surface for supporting an article between two thermoplastic sheets and jaw means for clamping and heat sealing the thermoplastic sheets for enclosing the article, the present invention providing the improvement of means for moving the work surface for relieving tension in the thermoplastic sheets during operation of the jaw means.

According to another feature of the present invention, a suitable means is operative after operation of the jaw means for directing a current of cooling air at the seal formed between the thermoplastic film webs to prevent seal separation. The cooling air means preferably includes a source of forced air, an air discharge deflector disposed adjacent the work surface of the apparatus, and a valve for opening and closing communication between the forced air source and the air discharge deflector, with suitable means for opening the valve following operation of the jaw means.

In the preferred embodiment, the present invention is incorporated in an L-sealing apparatus adapted for heat sealing two webs of folded thermoplastic film along an L-shaped seal line comprising a frame having an endless conveyor forming a work surface for supporting an article between the film webs, a clamping jaw having an L-shaped sealing bed surface mounted on the frame generally adjacent the conveyor, and a heating jaw having L-shaped heating means pivotably mounted on the frame for pivotal movement into and out of abutting relationship with the clamping jaw for clamping and heat sealing the film webs to enclose the article therebetween. The conveyor is normally operable in a forward direction for discharging sealed thermoplastic film-enclosed articles away from the jaws. The present invention provides conveyor reversing means operable during pivotal movement of the heating jaw into abutting relationship with the clamping jaw for moving the conveyor a predetermined increment of movement in a reverse direction toward the jaws for relieving tension in the folded thermoplastic film for enhanced sealing of the webs thereof. Preferably, a timer is provided for establishing a predetermined time period of reverse operation of the conveyor, the timer being actuated simultaneously with actuation of pivotal movement of the heating jaw toward the clamping jaw. The cooling air means is actuated upon pivotal movement of the heating jaw out of abutting relationship with the clamping jaw following a film sealing operation.

BRIEF DESCRIPTION OF THE DRAWINGS

FIG. 1 is an overall perspective view of an L-sealing apparatus embodying the improvement of the present invention;

FIG. 2 is an enlarged elevational view of a microswitch arrangement for actuating the heating arrangement of the sealing arm of the apparatus of FIG. 1;

FIG. 3 is an enlarged elevational view of another microswitch arrangement for de-activating the heating arrangement of the sealing arm;

DESCRIPTION OF THE PREFERRED EMBODIMENT

Figure 4:
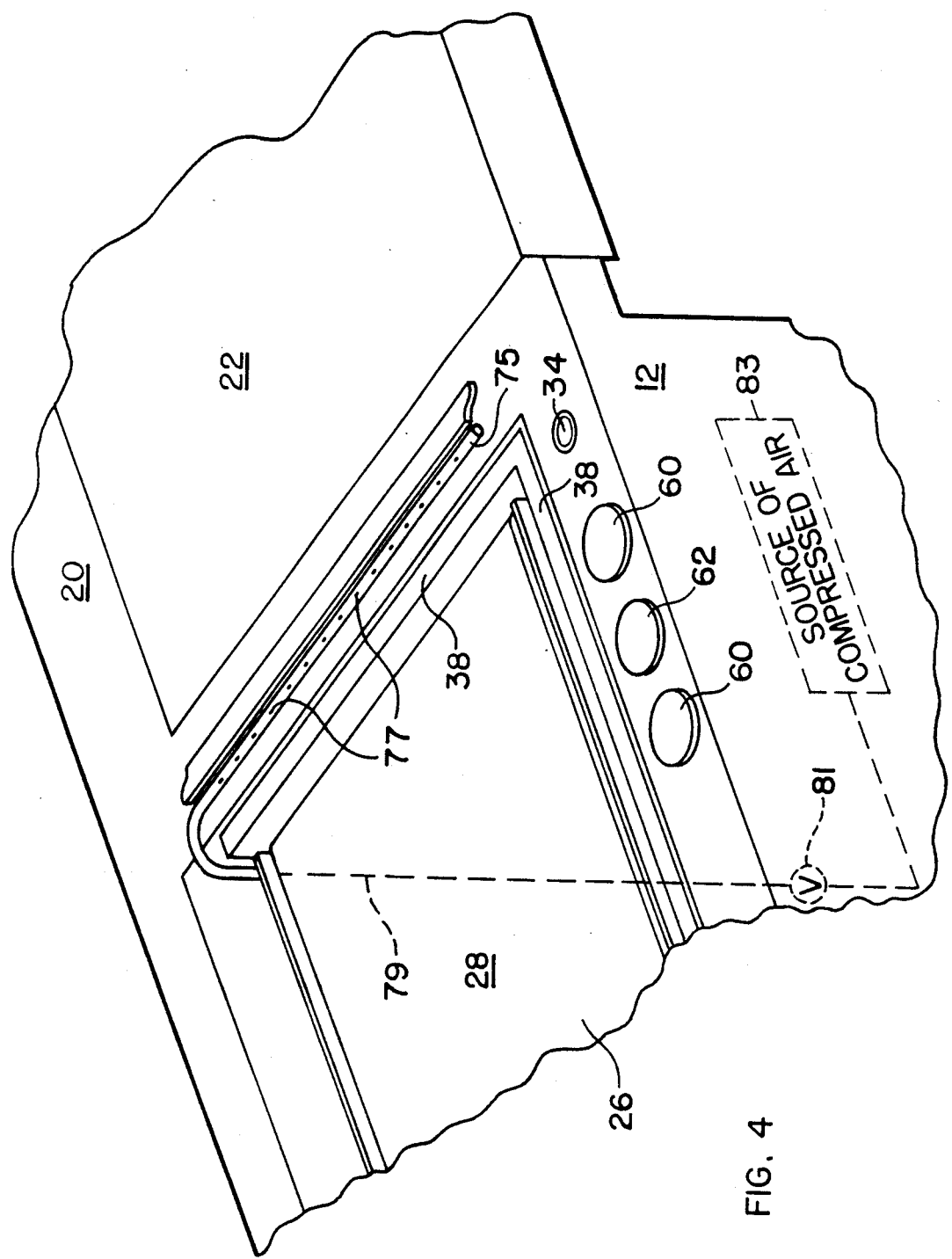
FIG. 4 is an enlarged elevational view of the seal cooling arrangement of the L-sealing apparatus of FIG. 1.

Referring now to the accompanying drawings, the present invention is herein illustrated and described as embodied in an L-sealing apparatus of the type described and illustrated in the aforementioned U.S. Pat. No. 4,650,535. The basic construction and operation of the L-sealing apparatus of such patent is herein described and illustrated only to the extent reasonably necessary to facilitate a complete and enabling disclosure and understanding of present invention and to the extent that the L-sealing apparatus differs otherwise from that disclosed in the aforesaid patent. Furthermore, as those persons skilled in the art will readily recognize, the present invention is equally well adapted to be embodied in other apparatus for heat sealing thermoplastic film and sheeting material and, accordingly, the disclosure herein of the present invention as preferably embodied in an L-sealing apparatus is only illustrative for the purpose of providing a full and enabling disclosure of the invention and is not to be construed as a limitation on the present invention.

With reference initially to FIG. 1, an L-sealing apparatus is shown generally at 10 and basically includes a frame 12 having a table-like section 14 at one end thereof forming a packaging area and a cabinet-like section 16 at the other end thereof for housing and supporting the sealing components to form a sealing area.

A film supporting and dispensing mechanism 18 is mounted to the frame 12 at the end of the packaging table section 14 for rotatively supporting a conventional roll (not shown) of center-folded heat-shrinkable thermoplastic film, or another suitable heat sealable plastic sheeting, for rotational off-winding of the film.

The packaging table section 14 of the frame 12 has a horizontal planar top panel 20 and another planar panel 22 mounted in parallel relation therewith at a slight spacing above the top panel 20 sufficient to permit passage of one folded web of the film between the panels 20, 22 while the other folded web of the film is passed over the top surface of the panel 22, whereby the panel 22 forms a packaging table surface.

The cabinet section 16 of the frame 12 includes a box-like lower enclosure 24 for containing most of the electrical components of the apparatus hereinafter described. The remainder of the cabinet section 16 is generally enclosed at its front, rear and central sides to define an open-top channel area above the box-like enclosure 24 within which a sealing conveyor table 26 is housed. The conveyor table 26 has a motor-driven endless conveyor belt 28 having a horizontal top run arranged to extend generally coplanarly with and to move endwardly away from the packaging table section 14. As more fully described hereinafter, the operating motor for driving the conveyor belt 28 is arranged according to the present invention for selectively reversible operating for moving the upper horizontal run of the belt 28 either in a forward direction toward the adjacent end of the frame 12, as indicated by the directional arrow F in FIG. 1, for discharging articles after being sealed within the thermoplastic film or in a reverse direction toward the table section 14, as indicated by the directional arrow R in FIG. 1, for relaxing the thermoplastic film preparatory to a sealing operation, all as more fully described hereinafter.

A sealing arm assembly 30 is pivotably mounted to the frame 12 along the upper rearward side of the cabinet section 16 for pivotal movement upwardly and downwardly relative to the frame 12 between an upward position spaced apart from the frame 12 and a downward position adjacent the frame 12. An electrically resistance-heated L-shaped wire heating assembly 32 is mounted along the forward free side and the adjacent inward transverse side of the sealing arm assembly 30.

A pair of electromagnets 34 are mounted at opposite ends of the upper forward surface of the cabinet section 16 and a pair of metal armature disks 36 are affixed at the opposite ends of the forward free side of the sealing arm assembly 30 for latching engagement of the sealing arm assembly 30 by the electromagnets 34 to hold the sealing arm assembly 30 essentially rigid and fixed when in its downwardly pivoted disposition.

An L-shaped sealing bed assembly 38 is supported at its opposite ends and intermediately at its corner respectively on the piston rods of three piston-and-cylinder assemblies (not shown) mounted in upstanding disposition to the frame 12 within the channel area of the cabinet section 16 for disposition of the sealing bed assembly 38 extending inwardly along the forward and central margins of the channel area wherein the sealing bed assembly 38 is positioned immediately beneath the wire heating assembly 32 of the sealing arm assembly 30 when in its downward position adjacent to frame 12. Thus, the sealing bed assembly 38 is adapted to assume varied orientations with respect to the frame 12 and the sealing arm assembly 30 by the varied extension of the piston rods of the piston-and-cylinder assemblies.

Another piston-and-cylinder 40 is pivotably mounted to the rear wall of the cabinet section 16 of the frame 12 centrally within the channel area thereof for actuating pivotal movement of the sealing arm assembly 30 upwardly and downwardly with respect to the frame 12 for movement into and out of its aforedescribed upward and downward dispositions.

Each of the three piston-and-cylinder assemblies associated with the sealing bed assembly 38 and the piston-and-cylinder assembly 40 associated with the sealing arm assembly 30 are of the so-called double-acting type adapted for compressed air operation. The L-sealing apparatus includes a source of compressed air (not shown, except schematically in FIG. 4) with an air flow control circuitry including suitable solenoid valves for controlling the flow of compressed air from the source respectively to the piston-and-cylinder assemblies as determined by the actuation and deactuation of the solenoid valves by the electrical control circuitry of the apparatus 10 as more fully hereinafter described.

As seen in FIGS. 1 and 4, a hollow tubular manifold 75 is mounted to the frame immediately alongside the central transverse margin of the channel area of the cabinet section 16, the manifold 75 having a plurality of radial perforations 77 generally aligned along the side thereof facing the channel area and the manifold 75 being connected through a supply tube 79 and a solenoid-operated control valve 81 with the compressed air source 83 of the L-sealing apparatus 10 for selectively emitting a flow of compressed air through the perforations 77 at a predetermined time during the sequence of operation of the L-sealing apparatus 10 for purposes of assisting in the cooling and curing of the transverse seals in the thermoplastic film formed by the wire heating assembly 32, as more fully explained hereinafter.

As best seen in FIG. 2, a microswitch 42 is mounted to the frame 12 within the channel area immediately below the sealing bed assembly 38 for depression of the exposed button of the microswitch 42 when the sealing bed assembly 38 is in a relatively downward disposition produced by retraction of the pistons of the supporting piston-and-cylinder assemblies and for release of the exposed microswitch button when the sealing bed assembly 38 assumes an elevated disposition produced by extension of the piston of the supporting piston-and-cylinder assemblies. The microswitch 42 is arranged in the electrical control circuitry for the L-sealing apparatus, hereinafter more fully described, to actuate the wire heating assembly 32. For this purpose, the microswitch 42 is of a normally closed type so as to be open when its button is depressed and to be closed when its button is released.

Two additional microswitches 44, 46 are mounted at the upper rear side of the cabinet section 16 immediately beneath the pivoted side of the sealing arm assembly 30 for depression of the exposed buttons of the microswitches 44, 46 when the sealing arm assembly 30 is in its downward position adjacent the frame 12. As hereinafter more fully explained, the microswitch 44 is arranged in the electrical control circuitry for the L-sealing apparatus to actuate the three piston-and-cylinder assemblies supporting the sealing bed assembly 38 when the sealing arm assembly 30 is lowered to its downward position adjacent the frame 12. The microswitch 46 is arranged in the electrical control circuitry to actuate the conveyor belt 28 in its normal forward direction upon the completion of each sealing cycle. For this purpose, the microswitch 44 is arranged to be normally open when its button is not depressed and to be closed when the button is depressed by the sealing arm assembly 30 while the microswitch 46 is arranged to be normally closed when its button is not depressed and to be opened when its button is depressed by the sealing arm assembly 30.

As shown in FIG. 3, a microswitch 48 is mounted to the sealing arm assembly 30 and an actuating arm 50 is pivotably mounted to the sealing arm assembly 30 with one end of the actuating arm 50 operatively connected to the wire heating assembly 32 for actuating pivotal movement of the arm 50 in response to temperature-related expansion and contraction of the wire heating assembly 32 and with the opposite end of the arm 50 disposed for corresponding movement into and out of contact with the actuating button of the microswitch 48 for depressing and releasing it. As hereinafter described, the microswitch 48 is arranged in the operating electrical control circuitry for the L-sealing apparatus to shut-off operating electricity to the wire heating assembly 32 upon closing of the microswitch 48 in response to expansion of the wire heating assembly 32 to a degree indicating a desirable maximum temperature of the wire heating assembly 32 has been reached.

Figure 5:
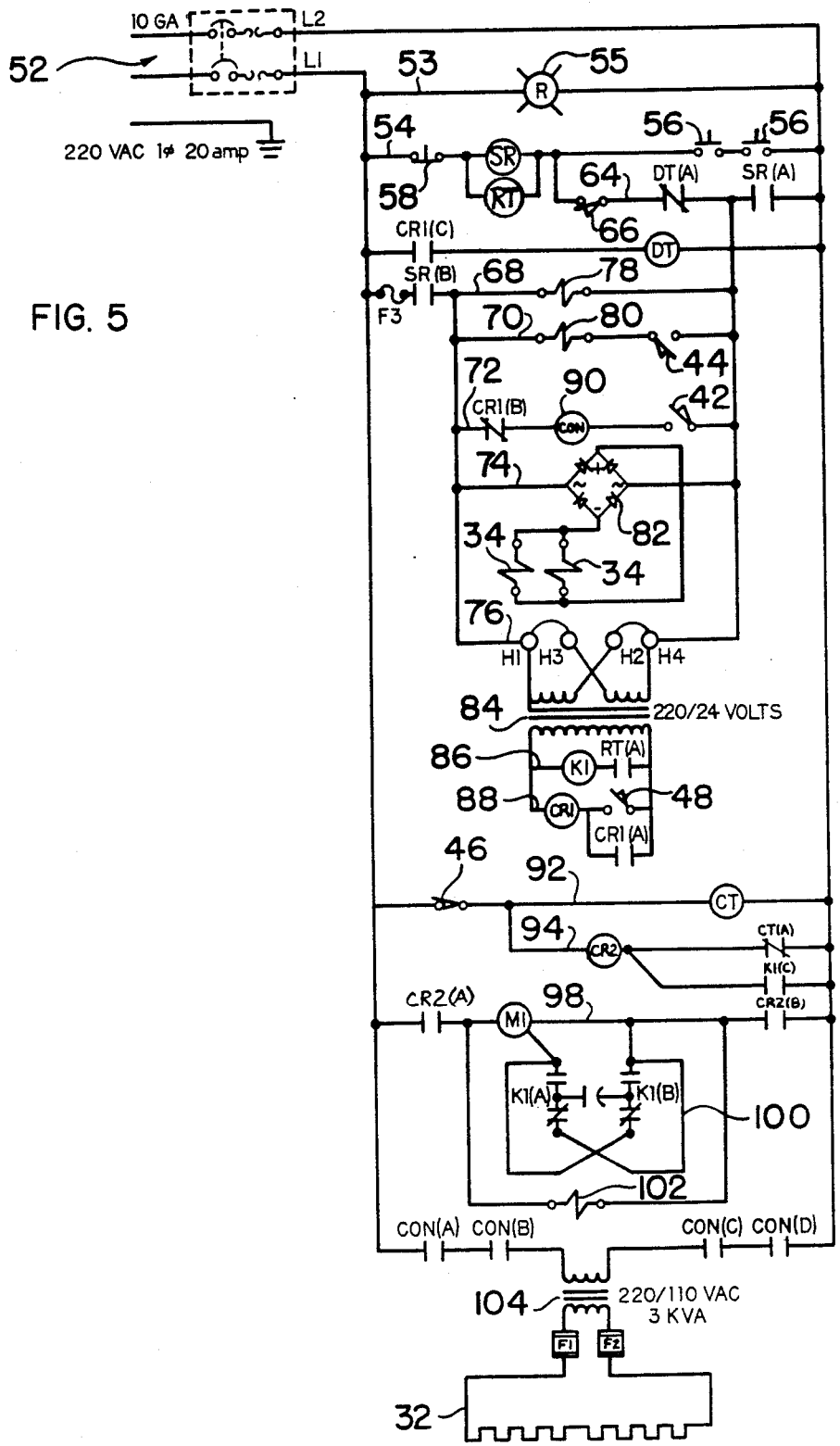
FIG. 5 is a schematic wiring diagram of the electrical control circuitry for the L-sealing apparatus of FIG. 1.

Referring now to FIG. 5, a schematic diagram of the electrical control circuitry for the L-sealing apparatus 10 is shown. Operating electrical power for the L-sealing apparatus 10 is supplied from a source of 220 volt alternating electrical current indicated at 52, across which are connected several operating circuits. An indicator circuit 53 has an indicator light 55 to be illuminated when operating electrical power is supplied to the control circuitry to provide a visual indication that the L-sealing apparatus 10 is in an "on" condition. In a first actuating circuit 54, a pair of manually-operated normally-open actuating switches 56 are connected in series with a manually-operated normally-closed deactuating switch 58 and an actuating relay SR. Operating buttons 60, 62 for the actuating and deactuating switches 56, 58, respectively, are located on the upper forward side of the cabinet section 16 of the frame 12 for easy operator access and actuation. A timer RT is operatively connected in the actuating circuit 54 in parallel to the relay SR. A branch circuit 64 is connected between the circuit 54 and one leg of the power supply 52 and includes a normally-closed safety switch 66 arranged in association with sealing arm assembly 30 to open in response to any obstruction of the downward pivotal movement of the sealing arm assembly 30, normally-closed contacts DT(A) of a dwell timer DT, and normally-open contacts SR(A) of the actuating relay SR connected in series.

Five operating circuits 68, 70, 72, 74, 76 are connected in parallel between the branch circuit 64 and another set of normally-open contacts SR(B) of the actuating relay SR connected by a fuse F3 to one leg of the power supply 52. The operating circuit 68 includes a solenoid 78 associated with a valve arranged in the compressed air flow circuitry of the L-sealing apparatus 10 for controlling compressed air flow to the piston-and-cylinder assembly 40 for actuating and deactuating pivotal movement of the sealing arm assembly 30. The operating circuit 70 includes the normally-open microswitch 44 in series with another solenoid 80 associated with another valve arranged in the compressed air flow circuitry for controlling compressed air flow to the three piston-and-cylinder assemblies supporting the sealing bed assembly 38 for actuating upward and downward movement thereof. The operating circuit 74 includes a bridge rectifier 82 to which the electromagnets 34 are connected in parallel to provide a direct current power supply to the electromagnets. The operating circuit 76 includes a step-down transformer 84 across which secondary circuits 86, 88 are connected in parallel, the circuit 86 including normally-open contacts RT(A) of the timer RT in series with a relay K1 for controlling reversals of the forward-reverse operating condition of the motor M1 for the conveyor table 26 and the circuit 88 including the normally-open microswitch 48 in series with an associated relay CR1. Normally-open contacts CR1(A) of the relay CR1 are connected across the circuit 88 in parallel with the microswitch 48. Normally-closed contacts CR1(B) associated with the relay CR1 are connected in series with a 20, 20 heat contactor 90 and the microswitch 42 to form the operating circuit 72. Another set of normally-open contacts CR1(C) of the relay CR1 are connected in series with the aforementioned dwell timer DT across the power supply 52.

The microswitch 46 and another timer CT are connected in series across the power supply 52 to form another circuit 92, with a branch circuit 94 having a relay CR2 in series with normally-closed contacts CT(A) of the timer CT being connected between one leg of the power supply 52 and the circuit 92 intermediate the microswitch 46 and the timer CT and with a further branch circuit 96 containing normally-open contacts K1(C) of the relay K1 being connected between the relay CR2 and one leg of the power supply 52.

The conveyor motor M1 is connected in series with two sets of normally-open contacts CR2(A), CR2(B) of the relay CR2 to form another operating circuit 98. The relay K1 includes reversible contacts K1(A) and K1(B), each of which has reversible normally-open and normally-closed contacts, which are connected in a capacitor 100 connected between the conveyor motor M1 and the operating circuit 98 to permit reversal of the forward-reverse operating condition of the motor M1. A solenoid 102 is connected across the operating circuit 98 in parallel with the conveyor motor M1 and its capacitor 100, the solenoid 102 being arranged in the compressed air flow circuitry of the L-sealing apparatus 10 for operating the valve 81 for controlling compressed air supply to the cooling manifold 75.

A transformer 104, to which the sealing wires of the wire heating assembly 32 are connected through fuses F1, F2, is connected in series with four sets of contacts CON(A), CON(B), CON(C) and CON(D) associated with the heat contactor 90 to form another operating circuit.

In operation of the L-sealing apparatus 10, a roll (not shown) of appropriate center-folded heat-shrinkable thermoplastic film is placed on the film dispenser 18 for rotational off-winding of film from the roll. The film roll is positioned with the center fold thereof toward the rear side of the frame 12 and the two folded webs of the film at the leading edge of the film roll are separated with the lower web passing beneath the panel 22 and the upper web passing over the panel 22. The operator is thus enabled to easily insert an article to be packaged between the webs by merely lifting the upper web portion from the panel 22 and sliding the article onto the panel 22 beneath the upper web.

As will be understood, in the continuous operation of the apparatus 10, each sealing cycle will leave the leading end of the film with a transverse seal so that the film upon initiating each packaging cycle will already be joined transversely at the leading end thereof and along the center fold line. A suitable length of the film with the inserted article between the webs thereof is drawing manually by the operator toward and is placed on the conveyor belt 28 of the conveyor table 56 with the unjoined longitudinal and transverse extents of the upper and lower film webs adjacent the inserted article being positioned on the L-shaped sealing bed assembly 38.

The operator next depresses both of the operating buttons 60 to close the actuating switches 56, whereupon the actuating circuit 54 is completed to energize the actuating relay SR. In turn, the normally-open contacts SR(A) and SR(B) of the relay SR are closed to energize the solenoid 78 associated with the piston-and-cylinder 40 to actuate downward pivotal movement of the sealing arm assembly 30. At the same time, the electromagnets 34 are also energized.

Simultaneously upon the completion of the actuating circuit 54, the timer RT is also immediately energized, whereupon its contacts RT(A) are closed to energize the relay K1. The normally-open contacts K1(C) of the relay K1 are thereby closed and the relay CR2 is, in turn, energized, closing its normally-open contacts CR2(A) and CR2(B). At the same time, the condition of each of the contacts K1(A) and K1(B) of the relay K1 is reversed, i.e. their normally-closed contacts are opened and their normally-open contacts are closed, to reverse the operable condition of the conveyor motor M1. The microswitch 46 remains in its normally-closed condition until the sealing arm assembly 30 reaches its downward position adjacent to frame 12 and, therefore, the conveyor motor M1 is energized upon the closing of the contacts CR2(A) and CR2(B) and operates in the reverse direction R until the predetermined time period of the timer RT elapses, whereupon its contact RT(A) open to deenergize the relay K1 returning its contacts K1(A), K1(B), K1(C) to their normal respective conditions and deenergizing the relay CR2 to open its contacts CR2(A), CR2(B) to deactuate the motor M1.

When the sealing arm assembly 30 reaches its downward position adjacent to frame 12, the electromagnets 34 engage the armature disks 36 on the sealing arm assembly 30 to retain the sealing arm assembly 30 in such downward disposition. The normally-closed microswitch 46 is engaged by the sealing arm assembly 30 and thereby opened to disenable the conveyor motor M1. Similarly, the normally-opened microswitch 44 is engaged by the sealing arm assembly 30 and thereby closed to energize the solenoid 80 associated with the three piston-and-cylinder assemblies supporting the sealing bed assembly 38 to supply operating compressed air thereto for elevating the sealing bed assembly 38 into abutment with the wire heating assembly 32 to clamp the webs of the thermoplastic film therebetween. Once the sealing bed assembly 38 has been raised to a sufficient extent to release the microswitch 42, the microswitch 42 thereby assumes a closed state, energizing the heat contactor 90 and, in turn, closing its contacts CON(A), CON(B), CON(C), CON(D) to energize the transformer 104 and supply electrical current to the sealing wires of the wire heating assembly 32 causing them to become heated to a sufficient temperature to effect heat sealing of the webs of the thermoplastic film together.

When the sealing wires of the wire heating assembly 32 have expanded sufficiently as a result of such heating to close the microswitch 48, the relay CR1 is energized and its normally-closed contacts CR1(B) are opened to deenergize the heat contactor 90 and deactuate the wire heating assembly 32. At the same time, the normally-open contacts CR1(C) of the relay CR1 are closed to actuate the dwell timer DT. When the predetermined time period of the timer DT elapses, its normally-closed contacts DT(A) are opened, deenergizing the actuating relay SR, the solenoids 78, 80, and the electromagnets 34, whereupon the piston-and-cylinder assembly 40 actuates pivotal return movement of the sealing arm assembly 30 to its upward position and the three piston-and-cylinder assemblies associated with the sealing bed assembly 38 return it downwardly to its retracted position.

As the sealing arm assembly 30 pivots upwardly, the microswitch 46 is released to return to its normally-closed condition to actuate the timer CT. The relay CR2 is simultaneously energized to again close its normally-open contacts CR2(A), CR2(B) and re-actuate the conveyor motor M1. However, because the relay K1 is not energized at this time, the motor M1 operates the conveyor belt 28 in its forward direction F to discharge the sealed thermoplastic sheet-enclosed article just formed toward the adjacent end of the frame 12.

Simultaneously, the solenoid valve 102 is energized to direct compressed air from the source 83 through the manifold 75 for emission of the air through the perforations 77 against the transverse seal of the film just formed to effect a sufficient degree of cooling and curing of the seal to prevent undesired separation.

As will thus be understood, the conveyor belt 28 is momentarily operated in a reverse direction at the beginning of the operating cycle immediately after operator placement of the film-sandwiched article to be sealed on the upper run of the conveyor belt 28 and in advance of completion of the downward pivotal movement of the sealing arm assembly 30 into clamping engagement of the film. Accordingly, the resultant incremental degree of reverse movement of the conveyor belt 28 serves to automatically relax any undesirable tension in the film webs which would otherwise tend to resist the clamping action of the sealing arm assembly 30. Thus, the sealing arm assembly 30 is allowed to clamp the film webs in a substantially untensioned state so that the heat-sealing action of the wire heating assembly 32 is enabled to achieve a sealing of the film webs together with essentially maximum seal strength. Advantageously, the automatic reversal of the conveyor belt 28 provided by the present invention achieves essentially the identical degree of film tension release during each operating cycle of the L-sealing apparatus 10 so that the film seals produced are of repeatably consistent strength. Further, the present invention avoids the conventional practice of the operator manually manipulating the film to relieve tension, thereby enabling the production capacity of the apparatus to be correspondingly increased. The provision of the cooling air manifold 75 serves to additionally enhance the strength of the seals produced utilizing the present invention by providing an initial cooling of the transverse seal line across the film webs in advance of package discharge to minimize any tendency of the seal to separate as a result of handling of the package immediately following the sealing operation.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In an apparatus for heat sealing thermoplastic sheeting of the type comprising an endless conveyor for supporting an article between two thermoplastic sheets and jaw means for clamping and heat sealing said thermoplastic sheets for enclosing said article, said endless conveyor being normally operable in a forward direction for discharging sealed thermoplastic sheet-enclosed articles away from said jaw means, the improvement comprising means for moving said conveyor in a reverse direction for relieving tension in said thermoplastic sheets during operation of said jaw means.

2. The improvement in an apparatus for heat sealing thermoplastic sheeting according to claim 1 and characterized further in that said work surface moving means includes timer means for establishing a predetermined time period of reverse operation of said conveyor.

3. The improvement in an apparatus for heat sealing thermoplastic sheeting according to claim 1 and characterized further in that said work surface moving means includes means for actuating said conveyor reverse moving means simultaneously with actuation of said jaw means.

4. The improvement in an apparatus for heat sealing thermoplastic sheeting according to claim 3 and characterized further in that said work surface moving means includes timer means for establishing a predetermined time period of reverse operation of said conveyor and means for actuating said timer means simultaneously with actuation of said jaw means.

5. The improvement in an apparatus for heat sealing thermoplastic sheeting according to claim 1 and characterized further by means operative after operation of said jaw means for directing a current of cooling air at the seal formed between said thermoplastic sheets to prevent seal separation.

6. The improvement in an apparatus for heat sealing thermoplastic sheeting according to claim 5 and characterized further in that said cooling air means comprises a source of forced air, an air discharge deflector disposed adjacent said work surface, and valve means for opening and closing communication between said forced air source and said air discharge deflector.

7. The improvement in an apparatus for heat sealing thermoplastic sheeting according to claim 6 and characterized further in that said cooling air means includes means for opening said valve means following operation of said jaw means.

8. In an L-sealing apparatus for heat-sealing two webs of folded thermoplastic film along an L-shaped seal line comprising a frame having an endless conveyor forming a work surface for supporting an article between said webs of said folded thermoplastic film, a clamping jaw having an L-shaped sealing bed surface mounted on said frame generally adjacent said conveyor, and a heating jaw having L-shaped heating means pivotably mounted on said frame for pivotal movement into and out of abutting relationship with said clamping jaw for clamping and heat sealing said webs of said folded thermoplastic film for enclosing said article therebetween, said conveyor being normally operable in a forward direction for discharging sealed thermoplastic film-enclosed articles away from said jaws, the improvement comprising conveyor reversing means operable into abutting relationship with said clamping jaw during pivotal movement of said heating jaw for moving said conveyor a predetermined increment of movement in a reverse direction toward said jaws for relieving tension in said folded thermoplastic film for enhanced sealing of said webs thereof.

9. The improvement in an apparatus for heat sealing thermoplastic sheeting according to claim 8 and characterized further in that said conveyor reversing means includes timer means for establishing a predetermined time period of reverse operation of said conveyor and means for actuating said timer means simultaneously with actuation of pivotal movement of said heating jaw toward said clamping jaw.

10. The improvement in an apparatus for heat sealing thermoplastic sheeting according to claim 8 and characterized further by means operative upon pivotal movement of said heating jaw out of abutting relationship with said clamping jaw following a film sealing operation for directing a current of cooling air at the seal formed between said thermoplastic sheets to prevent seal separation.

* * * * *